No. 630,376. Patented Aug. 8, 1899.
W. B. MANN.
AIR BRAKE.
(Application filed July 23, 1898.)
(No Model.) 2 Sheets—Sheet 1.
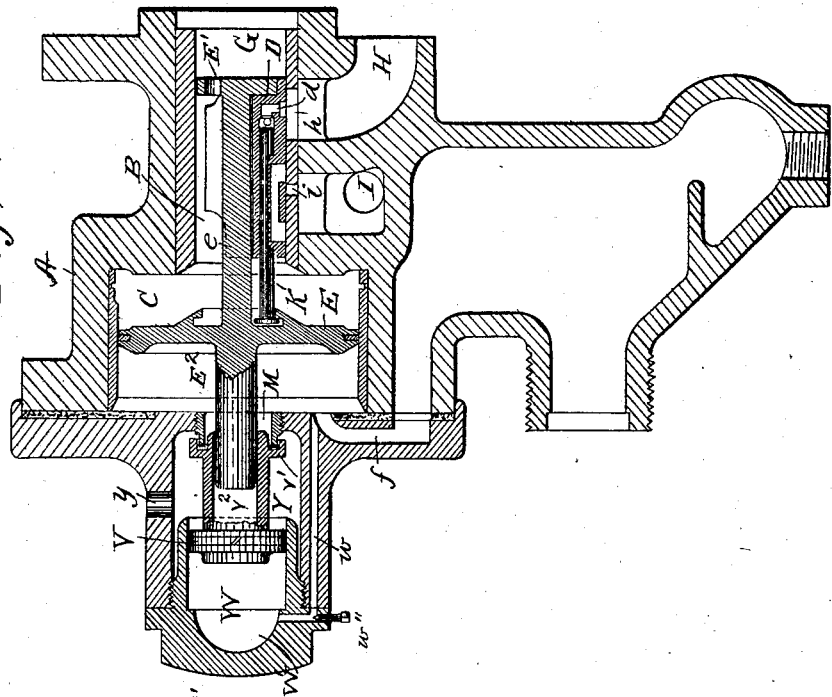
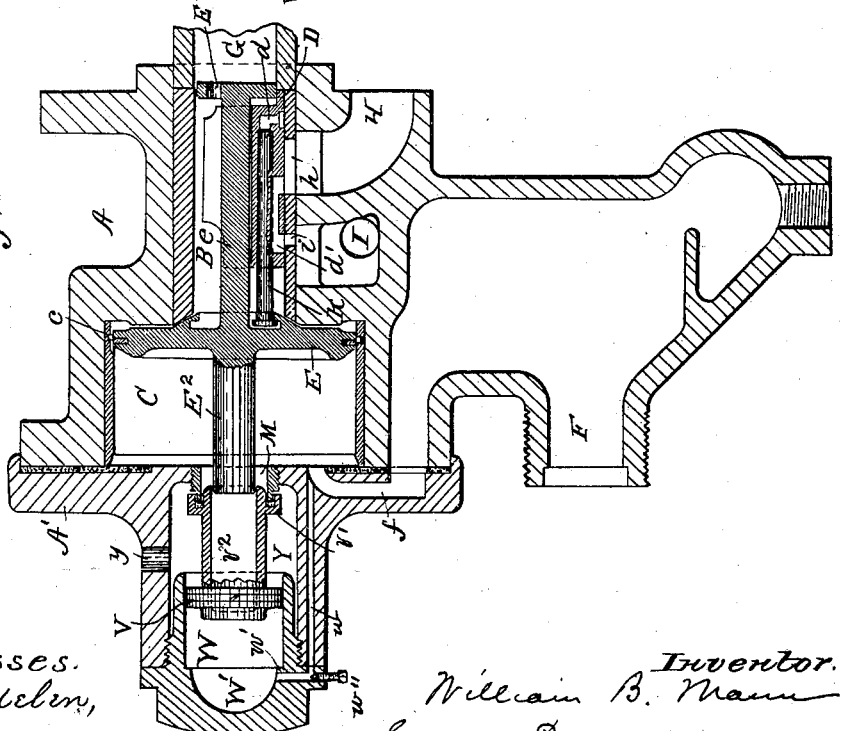
Witnesses.
W. R. Edelen,
Inventor.
William B. Mann
his attorneys

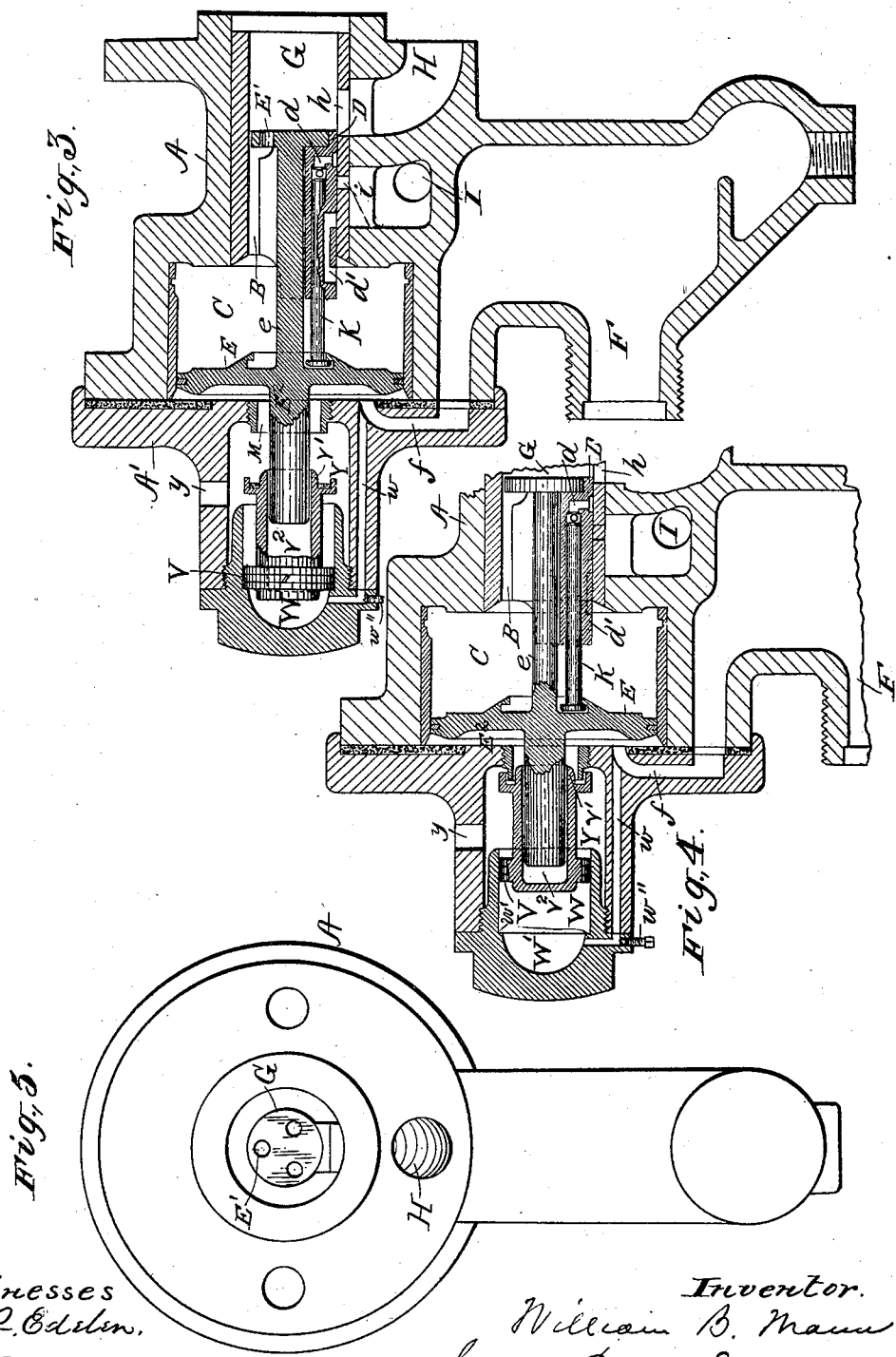

UNITED STATES PATENT OFFICE.

WILLIAM B. MANN, OF BALTIMORE, MARYLAND.

AIR-BRAKE.

SPECIFICATION forming part of Letters Patent No. 630,376, dated August 8, 1899.

Application filed July 23, 1898. Serial No. 686,721. (No model.)

*To all whom it may concern:*

Be it known that I, WILLIAM B. MANN, of Baltimore, Maryland, have invented a new and useful Improvement in Air-Brakes, which improvement is fully set forth in the following specification.

My invention relates to that class of fluid-pressure brakes known as "quick-action" brakes, in which the action of all the brakes on a long train is so nearly simultaneous that injurious shocks are avoided between the several cars forming the train.

It has been demonstrated that in order to obtain the required rapidity of action of the brakes on a long train of cars it is necessary to reduce the fluid-pressure in the train-pipe with greater celerity than would be done by venting such pipe at the engineer's valve alone, and the train-pipe is therefore vented serially at several points along the train, preferably under each car. In thus serially venting the train-pipe with a view to rapidly reducing the pressure therein as the initial step in securing the desired quick application of the brakes the air from the train-pipe has been allowed to escape to the atmosphere or has been conducted into the brake-cylinder, the former method having the advantage of being more rapid.

The object of the present invention is to provide means acting in combination with the triple valve whereby the train-pipe may be serially and rapidly vented to the atmosphere when it is desired to greatly reduce the pressure in the pipe to apply the brakes in an emergency, but which will remain inactive when it is desired to but slightly reduce the pressure in the train-pipe for ordinary service applications of the brakes.

With this object in view my invention consists of a triple valve constructed to admit compressed air from the auxiliary reservoir to the brake-cylinder for both service and emergency applications of the brakes, combined with a venting or exhaust valve controlling communication between the train-pipe and the atmosphere, said valve being held to its seat at all times except when the triple valve is thrown in an emergency application of the brakes, when the exhaust or venting valve instantly opens and upon the train-pipe pressure being reduced to the degree desired at once closes without regard to the then position of the triple valve. In order that the exhaust-valve may thus act, I provide means whereby it is held to its seat by pressure equal to ordinary train-pipe pressure when the brakes are off, means whereby a column of air at a pressure exceeding train-pipe pressure is applied to open the exhaust-valve when the triple valve is thrown to emergency position, and means whereby the pressure of said column of air may be quickly reduced and the exhaust-valve closed before the return movement of the triple valve.

In the preferred construction the exhaust-valve is of the puppet form and is held to its seat by train-pipe air in a chamber or cylinder behind the valve, which chamber communicates through a restricted passage with the train-pipe. Upon the movement of the triple valve for an emergency application of the brakes a plunger attached to the motor-piston of the triple valve acts to compress a column of air to a degree exceeding train-pipe pressure, and this column of air acting on the exhaust-valve opens it and holds it open until the pressure of said column of air is reduced (by a leak or exhaust provided for that purpose) to a point where it is overcome by the pressure in the closing chamber, when the exhaust-valve is promptly closed by the pressure in said chamber.

I have illustrated in the accompanying drawings one form which my invention may assume, in which—

Figure 1 is a vertical longitudinal section of a triple valve, venting-valve, and coöperating parts, together with the valve-casing, showing the conduits leading therefrom to the train-pipe, the auxiliary reservoir, the brake-cylinder, and the atmosphere, parts being shown in elevation and the valves in the position which they occupy when the brakes are released. Fig. 2 is a view similar to Fig. 1 with the parts in the position they occupy when the brakes are being applied for service stops. Fig. 3 is a view similar to Fig. 1 with the parts in the position they occupy when the brakes are being applied for emergency stops. Fig. 4 is a like view with the parts in the position they assume immediately after the train-pipe has been vented in making an emergency stop and while the brakes are still applied. Fig. 5 is an end view of Fig. 1 looking from the right.

Like letters of reference designate like parts in all the views.

My invention may be applied to any form of triple valve operated by the partial and full traverse of a motor-piston for making service and emergency application of the brakes; but I have shown it, for purposes of illustration only, as used in connection with a triple valve of the general character of that shown in United States Patent No. 220,556.

Referring to the drawings, a valve-casing is formed by uniting in any approved way the two castings A A'.

B is the triple-valve chamber, C the piston-chamber, and D the main valve, having the service and graduating passage $d$ and the exhaust-passage $d'$.

E is the motor-piston, $e$ the piston-stem, and E' the valve-operating head connected thereto, while F is the passage leading to the train-pipe; G, the passage to the auxiliary reservoir; H, the passage to the brake-cylinder, and I the vent-passage leading to the atmosphere. Communication is established between the brake-cylinder and the atmosphere through passage H, port $h$, passage $d'$, port $i$, and passage I, while at the same time compressed air from the train-pipe enters through the passages F $f$, chamber C, feed-in valve $c$, valve-chamber B, and passage G to the auxiliary reservoir. In service application of the brakes (see Fig. 2) ports $h$ and $i$ are disconnected and air passes from the auxiliary reservoir through passages G, valve-chamber B, restricted passage $d$ in main valve D, port $h$, and passage H to the brake-cylinder, while in emergency application (see Fig. 3) the air passes from the auxiliary reservoir through passage G, port $h$, and passage H to the brake-cylinder.

Owing to the lost motion between the piston-stem head E' and the main valve D, the power in the brake-cylinder during service applications may be graduated through the action of the graduating-valve K, which controls the port leading into the restricted passage $d$ from the valve-chamber B.

Opening out from the piston-chamber C and on the side thereof opposite the triple-valve chamber B is a port M, which leads into a chamber Y, which chamber has direct communication to the atmosphere through the passage $y$. In the chamber Y and opposite the port M is a cylinder W, within which a piston V snugly fits. As shown, this cylinder W is formed in a screw-cap attached to and projecting within the chamber Y and formed with the shoulder $w'$, which limits the throw of the piston V and provides a cushioning air-space W' even when the valve V' and piston V are in their rearmost position, as shown in Fig. 3. The piston V has a hollow stem $V^2$, which is closed at the end where the piston is attached and open at its other end and which bears an annular valve V', which surrounds the hollow stem and normally seats upon and closes the port M. The interior diameter of the hollow piston-stem $V^2$ is considerably less than the port M, and a plunger $E^2$, attached to the piston E, passes through the port M and enters the hollow stem $V^2$, the fit of the plunger $E^2$ in the hollow stem $V^2$ being such that air may pass into or out of the hollow stem around the plunger $E^2$. The cylinder W behind the piston V is in communication with the train-pipe through the restricted passage $w$, formed in the walls of the chamber Y. The air passing through this passage $w$ is adjustably controlled by the screw-plug $w''$, having a conical point extending into the passage, so that the area of the passage at this point may be regulated by turning the nut.

The operation of the device is as follows: When in service application of the brakes the train-pipe pressure is slightly reduced and the piston E makes a partial traverse and takes the position shown in Fig. 2, the plunger $E^2$ enters the hollow stem $V^2$ and slightly compresses the air in said hollow stem; but by reason of the loose fit of the plunger in the hollow stem the air in the latter escapes into the chamber C without any movement being imparted to the piston V, and consequently the valve V' remains seated. When, however, the pressure in the train-pipe is suddenly and considerably reduced and in consequence the piston E makes its full traverse and takes the position shown in Fig. 3, the plunger $E^2$ enters the hollow stem $V^2$ to such an extent that the air in the stem $V^2$ is greatly compressed, and this air so compressed reacts against the closed end of the stem and forces the piston V into the position shown in Fig. 3, thereby raising the valve V' off its seat and opening the port M. The air in the train-pipe then escapes to the atmosphere through the passages F $f$, chamber C, port M, chamber Y, and port $y$. Because of the loose fit of the plunger $E^2$ in the hollow stem $V^2$ the compressed air in the hollow stem escapes more rapidly from behind the plunger $E^2$ than does the air in the cylinder W from behind the piston V, and as soon as the pressure in front of the piston V is overcome by that in the cylinder W the piston V, piston-stem $V^2$, and valve V' will be moved from the open or venting position (shown in Fig. 3) to the closed position of Fig. 4. When compressed air is again admitted to the train-pipe, the valve is held in its closed position by reason of the fact that the area of the piston V exposed to pressure in the cylinder W and which tends to hold the valve closed is greater than that which is exposed to a like pressure from the opposite side, which tends to open the valve—that is, it is a differential piston with the greatest surface acting to close the valve.

It will be observed that there is no connection between the valve V' and the piston E and that the valve may be and is closed when the piston is in its normal position, Fig. 1, in position of partial traverse, Fig. 2, or in position of full or final traverse, Fig. 4.

By properly proportioning the port $y$ and the restricted passage $w$ by use of plug $w''$ and the escape of air between the plunger $E^2$ and hollow stem $V^2$ the valve $V'$ may be caused to close when the train-pipe is fully exhausted to the atmosphere or at any other particular degree of exhaust that may be desired.

It will be understood that my invention is not limited to the precise details of construction herein shown and described and that the invention may find various mechanical expressions without departing from the fundamental inventive idea.

Having thus described my invention, what I claim is—

1. The combination of a train-pipe, an auxiliary reservoir, a brake-cylinder, a triple valve and a piston having a partial and full traverse for operating the same, with an exhaust-valve closing a port leading from the train-pipe to the atmosphere, means whereby said exhaust-valve is held to its seat by train-pipe pressure, means whereby a column of air exceeding train-pipe pressure is applied to open the exhaust-valve when the triple valve is thrown to emergency position, and means whereby the pressure of said column of air is quickly reduced and the exhaust-valve closed, substantially as described.

2. The combination of a train-pipe, an auxiliary reservoir, a brake-cylinder, a triple valve and its operating-piston, with a valve closing a port between the train-pipe and the atmosphere, a differential piston normally holding said valve seated and means increasing the air-pressure on the smaller side of said differential piston when the triple valve is thrown to its emergency position, substantially as described.

3. The combination of the train-pipe, auxiliary reservoir, brake-cylinder, triple valve and operating-piston therefor with the exhaust-valve, the differential piston attached thereto and normally exposed to train-pipe pressure on both sides, and means for increasing the pressure on one side of said differential piston to a point above train-pipe pressure, whereby the differential piston is actuated to open the exhaust-valve, substantially as described.

4. The combination of the train-pipe, auxiliary reservoir, brake-cylinder, triple valve and operating-piston therefor, with the exhaust-valve, the differential piston attached thereto and normally exposed to train-pipe pressure on both sides, means actuated on the emergency throw of the triple-valve piston to increase the pressure on one side of said differential piston to a point above train-pipe pressure, whereby the exhaust-valve is opened and means reversing the preponderance of pressure whereby the exhaust-valve is closed, substantially as described.

5. The combination with the train-pipe, auxiliary reservoir, brake-cylinder, triple valve and its operating-piston, of a valve controlling a port leading from the train-pipe to the atmosphere and normally held seated by the train-pipe pressure, and means for securing air-pressure exceeding and overcoming said train-pipe pressure and opening said valve when the triple valve is thrown to its emergency position, substantially as described.

6. The combination with the train-pipe, the auxiliary reservoir, the brake-cylinder, the triple valve and its operating-piston, of a valve controlling a port leading from the train-pipe to the atmosphere, a differential piston normally holding said valve seated against train-pipe pressure and means for increasing the air-pressure on the train-pipe side of said piston and opening said valve when the triple valve is thrown to its emergency position, substantially as described.

7. The combination of the exhaust-valve, the differential piston exposed to air-pressure on both sides and the hollow piston-stem, with the triple-valve piston and the plunger thereon entering said hollow piston-stem, substantially as described.

8. The combination with a cylinder having an open port leading to the atmosphere, a port leading to the train-pipe, a valve closing the same, and a restricted passage connecting said chamber with the train-pipe, of a differential piston in said cylinder between the open port and the mouth of the restricted passage, a hollow stem connecting said piston and valve and a plunger attached to the triple-valve piston and loosely fitting said hollow stem, substantially as described.

9. The combination of the train-pipe, auxiliary reservoir, brake-cylinder, triple valve and its operating-piston, with an exhaust-valve controlling a port between the train-pipe and the atmosphere, a differential piston attached to said valve, means alternating the preponderance of pressure on the opposite sides of said differential piston whereby the exhaust-valve is opened and closed, and adjustable means regulating the length of time during which said exhaust-valve remains open, substantially as described.

In testimony whereof I have signed this specification in the presence of two subscribing witnesses.

WILLIAM B. MANN.

Witnesses:
S. T. CAMERON,
REEVE LEWIS.